United States Patent [19]

Seto

[11] Patent Number: 4,505,387
[45] Date of Patent: Mar. 19, 1985

[54] ROLL PACKAGE

[75] Inventor: Yoshihiro Seto, Minami-ashigara, Japan

[73] Assignee: Fuji Photo Film Co., Ltd., Kanagawa, Japan

[21] Appl. No.: 627,978

[22] Filed: Jul. 5, 1984

[30] Foreign Application Priority Data

Jul. 8, 1983 [JP] Japan .......................... 58-106304[U]
Dec. 16, 1983 [JP] Japan .......................... 58-193784[U]

[51] Int. Cl.³ .................... B65D 85/67; B65D 85/671; B65D 85/672
[52] U.S. Cl. ..................................... 206/414; 206/316
[58] Field of Search ............... 206/413, 414, 407, 396, 206/389, 410, 316

[56] References Cited

U.S. PATENT DOCUMENTS

| | | | |
|---|---|---|---|
| 1,091,139 | 3/1914 | Jagenberg | 206/410 |
| 1,560,555 | 11/1925 | Flynn | 206/389 |
| 1,989,182 | 1/1935 | Blake | 206/414 |
| 1,989,183 | 1/1935 | Blake | 206/414 |
| 2,105,368 | 1/1938 | Parsons | 206/407 |
| 2,883,045 | 4/1959 | Abramson | 206/396 |
| 3,261,460 | 7/1966 | Davis | 206/407 |
| 3,458,032 | 7/1969 | Leibowitz et al. | 206/410 |

Primary Examiner—William T. Dixson, Jr.
Attorney, Agent, or Firm—Wegner & Bretschneider

[57] ABSTRACT

A package for a roll of light-sensitive strip material which includes end covers and a circumferential cover. The circumferential cover is adhered to a leader connected to the outermost end of the strip or to the outermost end portion of the strip in the case no leader is used. The circumferential cover has a pair of side lips extending beyond the respective side edges of the strip and folded over the end covers. Each side lip has slits extending from the edge thereof toward, but terminating short of, the outer convolutions of the roll. The assembled roll and its package may be room-light loaded into exposure apparatus such as a camera, magazine, etc. with a portion of the circumferential cover extending from the roll. After the exposure apparatus has been sealed to light, the remainder of the circumferential cover may be stripped from the roll, tearing the side lips away from the rest of the circumferential covers so that successive convolutions of the strip material may be unwound from the roll.

4 Claims, 8 Drawing Figures

ROLL PACKAGE

BACKGROUND OF THE INVENTION

This invention relates to packaging of photosensitive material such as a photographic paper and a photographic film wound in a roll-shape, and more particularly to a package of photosensitive strip material as mentioned above adapted to be roomlight loaded into an exposure apparatus.

Such a package of photosensitive strip material as mentioned above is propsed in U.S. Pat. No. 4,148,395 which discloses a package serving to protect the photosensitive strip material therein from light and moisture and easily load the photosensitive material into a device under the roomlight. More particularly, the package includes a roll of a photosensitive strip material which is wound around a roll core with its radius increased and has generally flat end surfaces, and each cover for both the end surfaces of said roll, said end covers extending on a peripheral surface of said roll and having a rim fixed thereto, said rim having slits extending generally in an axial direction of the roll. Each slit is ended at a position where it does not reach the end surfaces of the roll.

Although the above-described prior art has a satisfactory function in the viewpoint that the photosensitive strip material wound in a roll-shape may be protected from light and moisture, it is disadvantageous in adaptability for use. That is to say, when the package of the photosensitive strip material in the prior art as above described is loaded in a magazine, and then is taken out and passed through a slit of the magazine, unevenness on the rims is rubbed or engaged with the slit, thus interfering with ready taking-out of the photosensitive strip material.

SUMMARY OF THE INVENTION

It is therefore an object of the present invention to provide a package for a roll of strip material which overcomes the problems associated with the prior art.

Another object of the present invention is to provide an improved package for a roll of strip material adapted to be roomlight loaded into an exposure apparatus such as a camera, magazine, etc. wherein the strip material can be smoothly pulled out of the exposure apparatus through a slit formed therein.

In accordance with an aspect of the present invention, there is provided a package for a roll of strip material coiled in convolutions of increasing radius and having generally flat end surfaces, comprising: an end cover for each end surface of the roll; a circumferential cover adhered to the coiled strip material for covering at least the outermost convolution of the coiled strip material with leaving the outermost end thereof uncovered, said circumferential cover having a pair of side lips extending beyond the respective side edges of the strip and folded over said end covers; and slits in said side lips extending from the edges of said side lips generally radially of the roll toward, but terminating short of, the outer convolutions of the roll.

In a preferred embodiment of the invention, a leader may be connected to the outermost end of the coiled strip material and circumferential cover may be adhered to the leader. Each end cover may have a plurality of ribs formed radially of the roll for reinforcing the package.

The above and other object, features and advantages of the present invention will be readily apparent from the following description taken in conjunction with the accompanying drawings.

DESCRIPTION OF THE PREFERRED EMBODIMENT

Now, the present invention will be described in more detail with reference to the attached drawings of the preferred embodiments.

Figure 1:
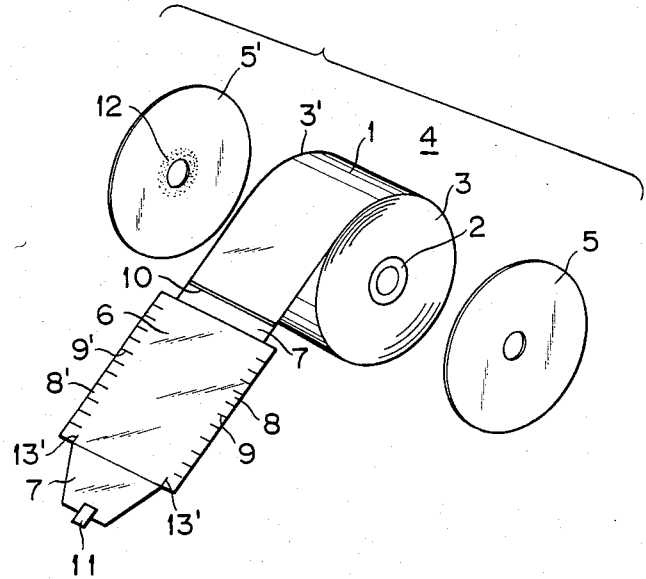
FIG. 1 is an exploded perspective view of a roll of photosensitive material or the like having a protective package including a light shielding circumferential cover and two end covers.
Figure 2:
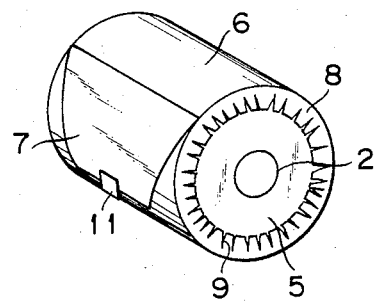
FIG. 2 is a perspective view of the assembled roll and package of FIG. 1.

Referring to FIG. 1, photosensitive strip material 1 such as a photographic paper or film is wound around a core 2, and forms a roll 4 having generally flat end surfaces 3 and 3'. Disc-like end surface cover 5 and 5' are provided on the end surfaces 3 and 3' so as to cover the end surfaces 3 and 3', while the roll 4 of the photosensitive strip material is covered with a light shielding circumferential cover 6 on its outer peripheral surface, as shown in FIG. 2. As shown in FIGS. 1 and 2, the light shielding cover 6 is provided on a leader 7 extending from the photosensitive strip material 1 with a tip end of the leader 7 exposed on an outer peripheral surface of the roll 4, and in such a manner as to surround the outer peripheral surface at least one round. Further, as shown in FIG. 1, the light sheilding cover 6 is wider than the photosensitive strip material 1, and extended portions or side lips 8 and 8' are provided with slits 9 and 9' perpendicular to the disc-like end surface covers 5 and 5' and having such depth as not to reach edges of the photosensitive material 1. In FIG. 1, reference numeral 10 designates a connecting portion of the photosensitive strip material 1 and the leader 7; 11 an adhesive tape piece provided at the tip end of the leader 7; 12 adhesive coated on the end surface covers for bonding the end surface covers to the core 2; and 13 and 13' slits provided in a longitudial direction of the light shielding cover 6. However, these are not essential elements of the present invention. Such elements as mentioned above are constituted as shown in FIG. 2, and the side lips 8 and 8' of the light shielding cover 6 are bonded to the end surface covers 5 and 5', thus completely forming the package of the photosensitive strip material according to the present invention.

Figure 3:
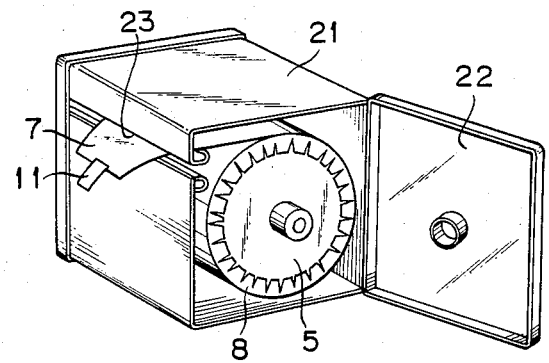
FIG. 3 is a perspective view of the assembled roll and package of FIG. 2 loaded into a film magazine.
Figure 4:
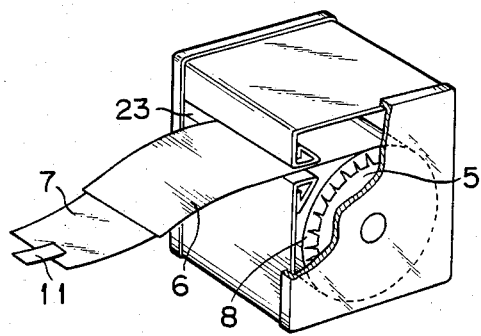
FIG. 4 is a perspective view similar to FIG. 3 with the magazine door closed and partially broken away to show the effect of pulling the leader from the roll.

In using the package of the photosensitive strip material according to the present invention, for example as shown in FIG. 3, the package including the photosensitive strip material 1 is accommodated in a magazine 21, and then a lid 22 is closed. Then, as shown in FIG. 4, the leader 7 is taken out from a slit 23 of the magazine 21. Accordingly, packaging against light shielding and moisture protecting is released in the magazine, thus allowing the photosensitive material to be supplied to a camera and the like under unexposed condition. When the leader 7 is taken out from the slit of the magazine 21, the light shielding circumferential cover 6 is broken along side edge of the leader 7 because it is fixed to the leader 7, and the side lips 8 and 8' bonded to the disc-like end surface covers 5 and 5' are left in the magazine 21, thus allowing the light shielding cover 6 together with the leader 7 to be taken out from the slit 23 of the magazine 21.

Figure 5:
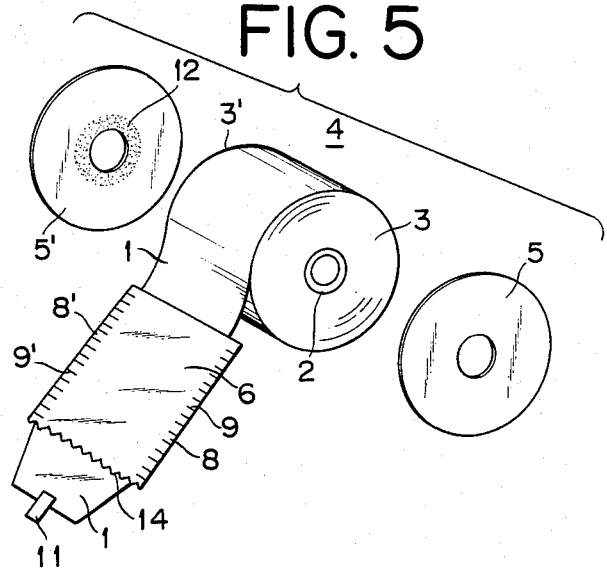
FIG. 5 is similar to FIG. 1 but showing another embodiment of the present invention wherein the circumferential cover is attached directly on the strip material.

Referring to FIG. 5 which shows another embodiment, the light shielding cover 6 is provided, without using a leader, on an end portion of the photosensitive strip material 1 with a part of the end portion exposed on the outer peripheral surface of the roll 4, and in such a manner as to surround the outer peripheral surface at least one round. Further, the light shielding cover 6 is wider than the photosensitive strip material 1, and the extended portions or side lips 8 and 8' are provided with slit 9 and 9' perpendicular to the disc-like end surface covers 5 and 5' and having such depth as not to reach the edges of the photosensitive material 1. In FIG. 5, the light shielding cover 6 is formed with saw teeth cutting 14 substituted for the slits 13 and 13' as in FIG. 1. Subsequent explanation in this embodiment is in the same manner as that in connection with FIGS. 2 to 4, and therefore it will be omitted. In applying this embodiment, although a part of the end portion of the photosensitive strip material 1 is exposed to light, resulting in uselessness, it should be understood that the constitution of this embodiment is not necessarily disadvantageous in the viewpoint of increased step of application of the leader.

Figure 6:
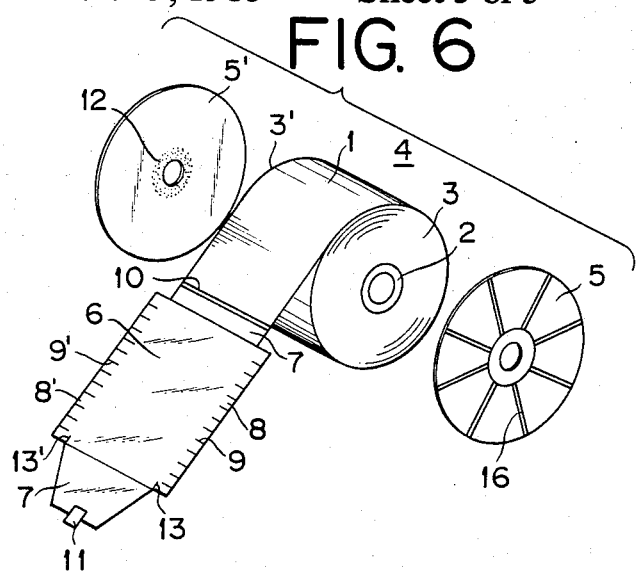
FIG. 6 is similar to FIG. 1 but showing still another embodiment of the present invention wherein each end cover has reinforcing ribs formed thereon.
Figure 7:
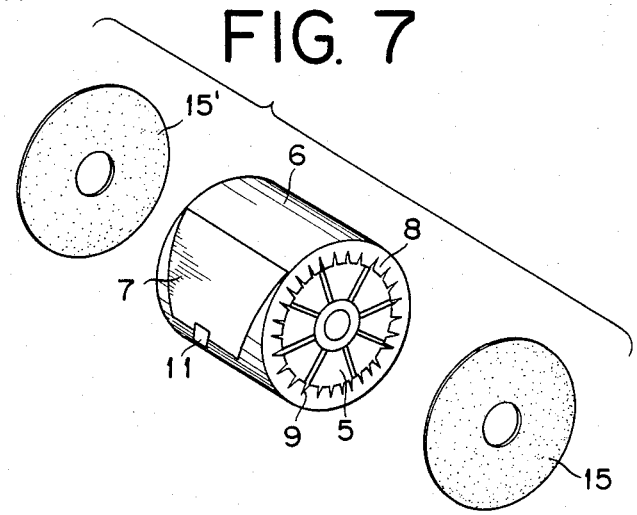
FIG. 7 is an exploded perspective view of the assembled roll and package of FIG. 6 with additional end covers.

Referring to FIGS. 6 and 7 which show still further embodiment of the present invention, the disc-like end surface cover 5 and 5' are provided with radially extending reinforcing ribs 16. By the provision of the reinforcing ribs 16, it is possible to increase flexural rigidity of the covers 5 and 5', and to prevent deformation of the covers during the production of the same. As shown in FIG. 7, another disc-like end surface covers 15 and 15' may be bonded to the end surface covers 5 and 5'. With this construction, sense of beauty may be effectively provided in addition to reinforcement of the packaged roll.

Such constitutions as above, that is, provision of the reinforcing ribs 16 for the disc-like end surface covers 5 and 5', and further provision of another disc-like end surface covers 15 and 15' are adaptable to the previous embodiment without using the leader as shown in FIG. 5.

Figure 8:
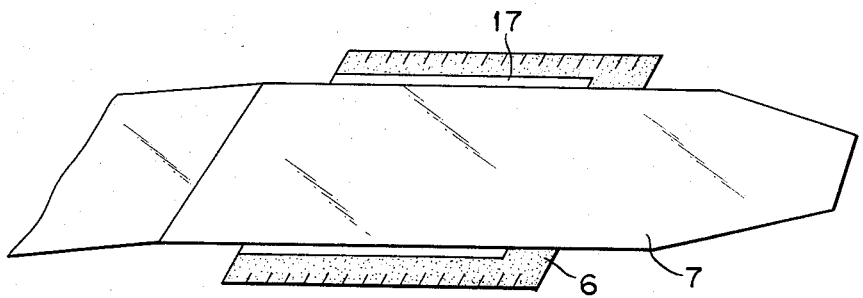
FIG. 8 is an enlarged perspective view showing how the circumferential cover is attached to the leader.

As shown in FIG. 8, a deseized portion 17 is provided near a bent portion of the light shielding cover 6, thereby preventing the adhesive from being adhering to the photosensitive material upon benting same. Deseizing may be easily carried out by adopting a gravure coating system, for example. It is preferred that width of the deseized portion does not reach the slits 9 for purposes of completely securing light shielding.

In the present invention, it is preferred to use sheet material mainly consisting of aluminium foil for example as the end surface covers 5 and 5' and the light shielding cover 6. Further, application of a minimum amount of the adhesive 12 as required to the end surface covers 5 and 5' is preferably carried out by a gravure coating system for example, thereby to bond the end surface covers to the core 2 only, and not to bond same to the end surfaces 3 and 3'. Further, when using the leader 7, it preferably has such opacity that light refracted through an end of the leader does not reach an inside thereof.

According to the present invention, as shown in FIG. 4, when the leader or the photosensitive strip material is taken out from the slit 23 of the magazine 21, the side lips 8 and 8' having slits are left together with the disc-like end covers 5 and 5' in the magazine, thereby preventing an uneven portion of the cover from being rubbed or engaged with the slit 23.

For further clarifying the effect of the present invention, an example will be described in the following manner.

EXAMPLE (1) Light shielding material

On both sides of an aluminium foil of 10 μm thickness, a biaxially stretched polyester film of 16 μm thickness was applied with an urethane-isocyanate adhesive layer 3 μm thickness to prepare a light shielding material of 48 μm thickness, wherein carbon black having particle size of 10–20 μm was mixed into the adhesive layer in the amount of 5 parts by volume.

(2) Leader material

A polyester film of 100 μm thickness containing carbon black having particle size of 10–20 μm in the amount of 1 part by volume was prepared by a stretching method.

(3) Adhesive

Hot melt type adhesive mainly consisting of ethylene-vinyl acetate copolymer was used.

(4) Photosensitive strip material

Monochrome silver-halides emulsion layer of 150 μm thickness, 70 mm length and sensitivity of ASA 100 was coated on tricellulose acetate base to form a photosensitive strip material, which is in turn wound around a core 2 of 70 mm length, 50 mm outer diameter and 25 mm inner diameter to form a cylindrical roll 4 having the size of 80 mm outer diameter and 70 mm length as in FIG. 1.

(5) Disc-like end surface cover

The adhesive as mentioned in the paragraph (3) was preliminarily coated on the light shielding material as mentioned in the paragraph (1) in the form of circle having a diameter of 50 mm by a gravure coating system. Such a circular adhesive layer 12 was punched through its central portion to form disc-like end surface covers 5 and 5' having an inner diameter of 25 mm and an outer diameter of 80 mm, as shown in FIG. 1.

(6) Leader

The leader material as mentioned in the paragraph (2) was cut into a rectangle having length of 370 mm and width of 70 mm, with its tip portion taperingly cut, and is connected to one end of the photosensitive strip material as mentioned in the paragraph (4) to prepare the leader 7 as shown in FIG. 1.

(7) Light shielding cover

The light shielding material as mentioned in the paragraph (1) was cut into a rectangle having length of 270 mm and width of 100 mm, and thirty nine slits of 10 mm depth were formed from a long line of the rectangle at right angles to the end surfaces 3 and 3' of the photosensitive strip material roll 4 as mentioned in the paragraph (4) at intervals of 7 mm to prepare the light shielding cover 6 as shown in FIG. 1. The cover 6 was applied to the leader 7 at a position 80 mm away from the tip of the leader.

(8) Package

The elements as mentioned in the paragraph (3) to (7) were combined to form the package of the photosensitive strip material as shown in FIG. 2. The tip portion of the leader was exposed by the length of 80 mm.

The package as mentioned above was loaded into a plastic magazine in the shape as shown in FIG. 3, which magazine being of 100 mm depth, 80 mm width and 100 mm height, and having a slit of 3 mm width and light shielding teremp materials on an upper and lower side of the slit. When the package was taken out as shown in FIG. 4, resistance of taking-out was constant at 800 g, and there was no problem in practical use.

Comparison:

When a package as disclosed in U.S. Pat. No. 4,148,395 using substantially the same materials as with the above-mentioned Example according to the present invention was taken out in the same manner, resistance of taking-out was 1000 g with much fluctuation, and there occurred a problem in practical use.

What is claimed is:

1. In a package for a roll of strip material coiled in convolutions of increasing radius and having generally flat end surfaces, the improvement comprising:
    an end cover for each end surface of the roll;
    a circumferential cover adhered to the coiled strip material for covering at least the outer most convolution of the coiled strip material with leaving the outermost end thereof uncovered, said circumferential cover having a pair of side lips extending beyond the respective side edges of the strip and folded over said end covers; and
    slits in said side lips extending from the edges of said side lips generally radially of the roll toward, but terminating short of, the outer convolutions of the roll.

2. The package as recited in claim 1 wherein each of said end covers has ribs extending radially of the roll and wherein the package further includes a second end cover mounted on each end cover.

3. In a package for a roll of strip material coiled in convolutions of increasing radius and having generally flat end surfaces, the improvement comprising:
    a leader connected to the outermost end of the strip forming at least the outermost convolution of the roll;
    an end cover for each end surface of the roll;
    a circumferential cover adhered to said leader for covering at least the outermost convolution of the roll with leaving the outermost end of said leader uncovered, said circumferential cover having a pair of side lips extending beyond the respective side edges of the strip and folded over said end covers; and
    slits in said side lips extending from the edges of said side lips generally radially of the roll toward, but terminating short of, the outer convolutions of the roll.

4. The package as recited in claim 3 wherein each of said end covers has ribs extending radially of the roll and wherein the package further includes a second end cover mounted on each end cover.

* * * * *